(12) United States Patent
Kasal et al.

(10) Patent No.: US 11,698,001 B2
(45) Date of Patent: Jul. 11, 2023

(54) CONTAINMENT SYSTEM FOR GAS TURBINE ENGINE

(71) Applicant: HONEYWELL INTERNATIONAL INC., Charlotte, NC (US)

(72) Inventors: Yathiraj Kasal, Karnataka (IN); Reha Gomuc, Phoenix, AZ (US); Abhay Naik, Karnataka (IN); Donald G. Godfrey, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/201,054

(22) Filed: Mar. 15, 2021

(65) Prior Publication Data

US 2021/0222588 A1 Jul. 22, 2021

Related U.S. Application Data

(63) Continuation of application No. 16/200,946, filed on Nov. 27, 2018, now Pat. No. 11,015,482.

(51) Int. Cl.
*F01D 21/04* (2006.01)
*F01D 25/24* (2006.01)
(Continued)

(52) U.S. Cl.
CPC ............. *F01D 21/045* (2013.01); *B22F 3/15* (2013.01); *B22F 10/00* (2021.01); *B33Y 80/00* (2014.12);
(Continued)

(58) Field of Classification Search
CPC ...... F01D 25/24; F01D 21/045; F01D 11/122; F01D 25/243; F01D 25/26; F01D 25/246; F01D 25/14; F01D 21/04; F01D 11/127; F04D 29/526; F04D 29/023; F04D 29/664; F04D 29/522; F04D 19/002; F05D 2220/36; F05D 2250/283; F05D 2300/603; F05D 2300/702; F05D 2220/32;
(Continued)

(56) References Cited

U.S. PATENT DOCUMENTS 4,149,824 A 4/1979 Adamson
4,547,122 A 10/1985 Leech
(Continued)

FOREIGN PATENT DOCUMENTS

EP 1073828 B1 2/2001
EP 2829687 A1 1/2015
WO 2012065155 A1 5/2012

*Primary Examiner* — Eric J Zamora Alvarez
(74) *Attorney, Agent, or Firm* — Lorenz & Kopf, LLP

(57) ABSTRACT

A containment system for a gas turbine engine includes an outer containment ring having a first projection that extends radially inward and an inner containment ring having at least a second projection that extends radially outward toward the outer containment ring. The second projection is offset and spaced apart from the first projection to define a chamber in a first state. The containment system includes a lattice defined within the chamber that spans the chamber, and the lattice is integrally formed with each of the outer containment ring and the inner containment ring. A density of the lattice varies in at least one of an axial direction and a radial direction. The second projection is configured to interlock with the first projection in a second state.

13 Claims, 15 Drawing Sheets

(51) Int. Cl.
  *F04D 29/52* (2006.01)
  *B33Y 80/00* (2015.01)
  *B22F 3/15* (2006.01)
  *B22F 10/00* (2021.01)
  B33Y 40/00 (2020.01)
  B22F 10/28 (2021.01)

(52) U.S. Cl.
  CPC .............. *F01D 25/24* (2013.01); *B22F 10/28* (2021.01); *B33Y 40/00* (2014.12); *F05D 2220/32* (2013.01); *F05D 2230/31* (2013.01); *F05D 2300/10* (2013.01)

(58) Field of Classification Search
  CPC ........... F05D 2220/327; F05D 2240/14; F05D 2300/522; F05D 2300/6012; F05D 2300/614; F05D 2300/615; F02C 7/05; Y10T 428/24149; B29C 44/569
  See application file for complete search history.

(56) References Cited

U.S. PATENT DOCUMENTS

| | | | |
|---|---|---|---|
| 5,409,349 | A | 4/1995 | Kulak et al. |
| 6,059,523 | A * | 5/2000 | Modafferi ............. F01D 21/045 |
| | | | 415/196 |
| 7,125,217 | B2 | 10/2006 | Care |
| 7,503,164 | B2 | 3/2009 | McMillan |
| 7,766,603 | B2 | 8/2010 | Beckford et al. |
| 8,202,041 | B2 | 6/2012 | Wojtyczka et al. |
| 2014/0161601 | A1 | 6/2014 | Geiger |
| 2017/0314416 | A1 | 11/2017 | Sharma et al. |

* cited by examiner

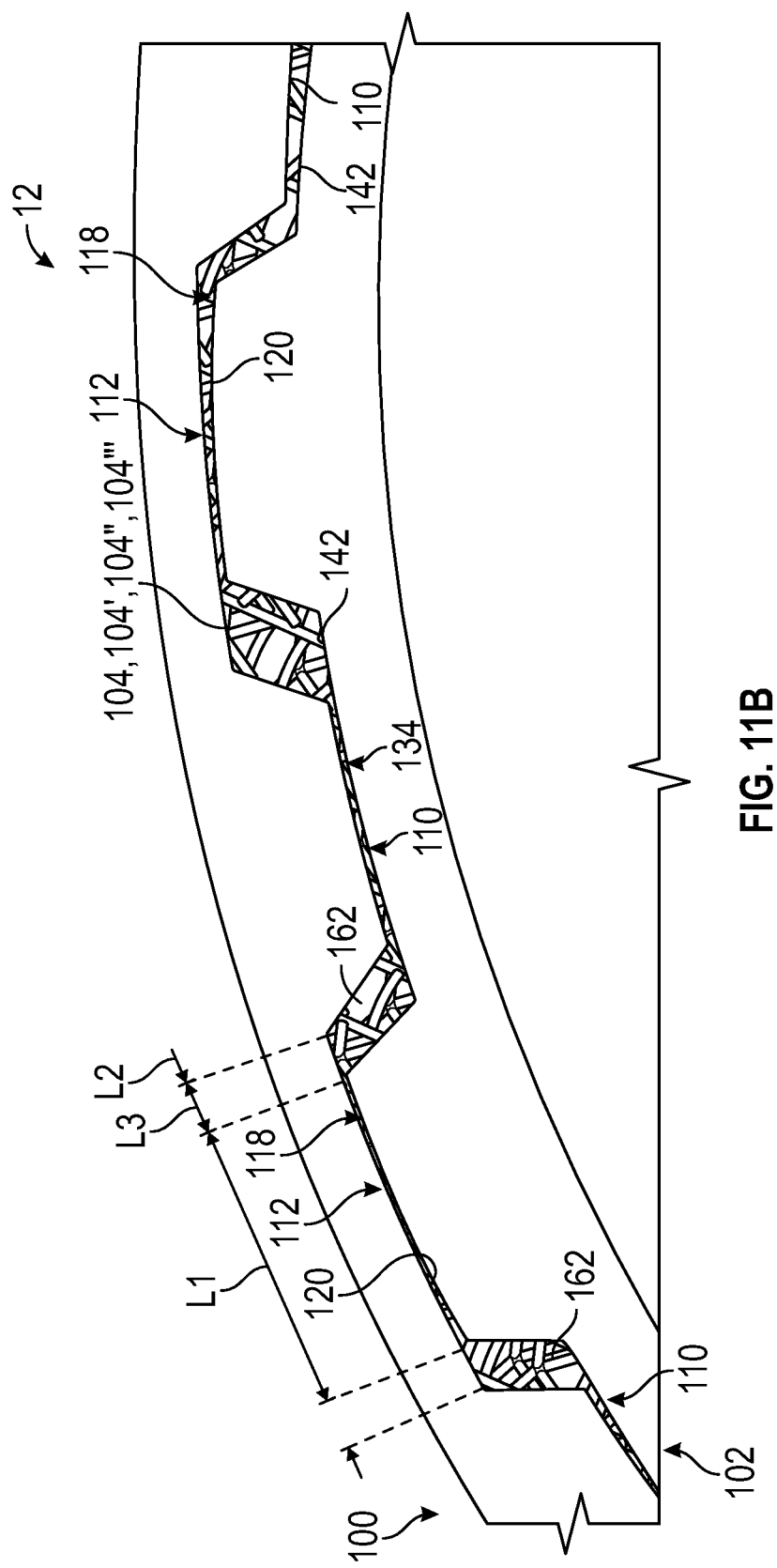

CONTAINMENT SYSTEM FOR GAS TURBINE ENGINE

CROSS-REFERENCE TO RELATED APPLICATION

This application is a continuation of U.S. patent application Ser. No. 16/200,946 filed on Nov. 27, 2018. The relevant disclosure of the above application is incorporated herein by reference.

TECHNICAL FIELD

The present disclosure generally relates to a containment system for use with gas turbine engines, and more particularly relates to a containment system having an outer containment ring, an inner containment ring and a lattice integrally formed with both the outer containment ring and the inner containment ring.

BACKGROUND

Containment rings can be employed with certain rotating devices to contain the rotating device during operation. For example, gas turbine engines include turbines and compressors. The turbines and compressors associated with the gas turbine engine can each include rotors, which can rotate at high speeds. In certain instances, each of the rotors can be surrounded by a containment ring, which can ensure the safe operation of the turbine and/or compressor. Generally, the containment of rotors is subject to federal requirements. In order to comply with the federal requirements, containment rings may have a large mass.

Accordingly, it is desirable to provide a containment system that meets or exceeds federal requirements and has a reduced mass. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is a containment system for a gas turbine engine. The containment system includes an outer containment ring having a first projection that extends radially inward and an inner containment ring having at least a second projection that extends radially outward toward the outer containment ring. The second projection is offset and spaced apart from the first projection to define a chamber in a first state. The containment system includes a lattice defined within the chamber that spans the chamber, and the lattice is integrally formed with each of the outer containment ring and the inner containment ring. The second projection is configured to interlock with the first projection in a second state.

Also provided according to various embodiments is a containment system for a gas turbine engine. The containment system includes an outer containment ring having a plurality of first projections spaced apart about a perimeter of the outer containment ring to define a plurality of first reliefs. Each of the plurality of first projections extends radially inward. The containment system includes an inner containment ring having a plurality of second projections spaced apart about a perimeter of the inner containment ring. Each of the second projections extends radially outward toward the outer containment ring, and each of the plurality of second projections is offset and spaced apart from each of the plurality of first projections to define a chamber between the outer containment ring and the inner containment ring in a first state. The containment system includes a lattice defined within the chamber that spans the chamber. The lattice is integrally formed with each of the outer containment ring and the inner containment ring to extend about a perimeter of the inner containment ring. Each of the plurality of second projections is configured to interlock with each of the plurality of first projections in a second state.

Further provided is a gas turbine engine. The gas turbine engine includes a rotating component and a containment system positioned about the rotating component. The containment system includes an outer containment ring having a first projection that extends radially inward and an inner containment ring having at least a second projection that extends radially outward toward the outer containment ring. The second projection is offset and spaced apart from the first projection to define a chamber in a first state. The containment system includes a lattice defined within the chamber that spans the chamber. The lattice is integrally formed with each of the outer containment ring and the inner containment ring, and the lattice has a density that varies in at least one of an axial direction and a radial direction between the inner containment ring and the outer containment ring. The second projection is configured to interlock with the first projection in a second state.

DESCRIPTION OF THE DRAWINGS

The exemplary embodiments will hereinafter be described in conjunction with the following drawing figures, wherein like numerals denote like elements, and wherein:

FIG. 11B is a detail view of the portion of the containment system of FIG. 2 in the second, interlocked state.

DETAILED DESCRIPTION

Figure 1:
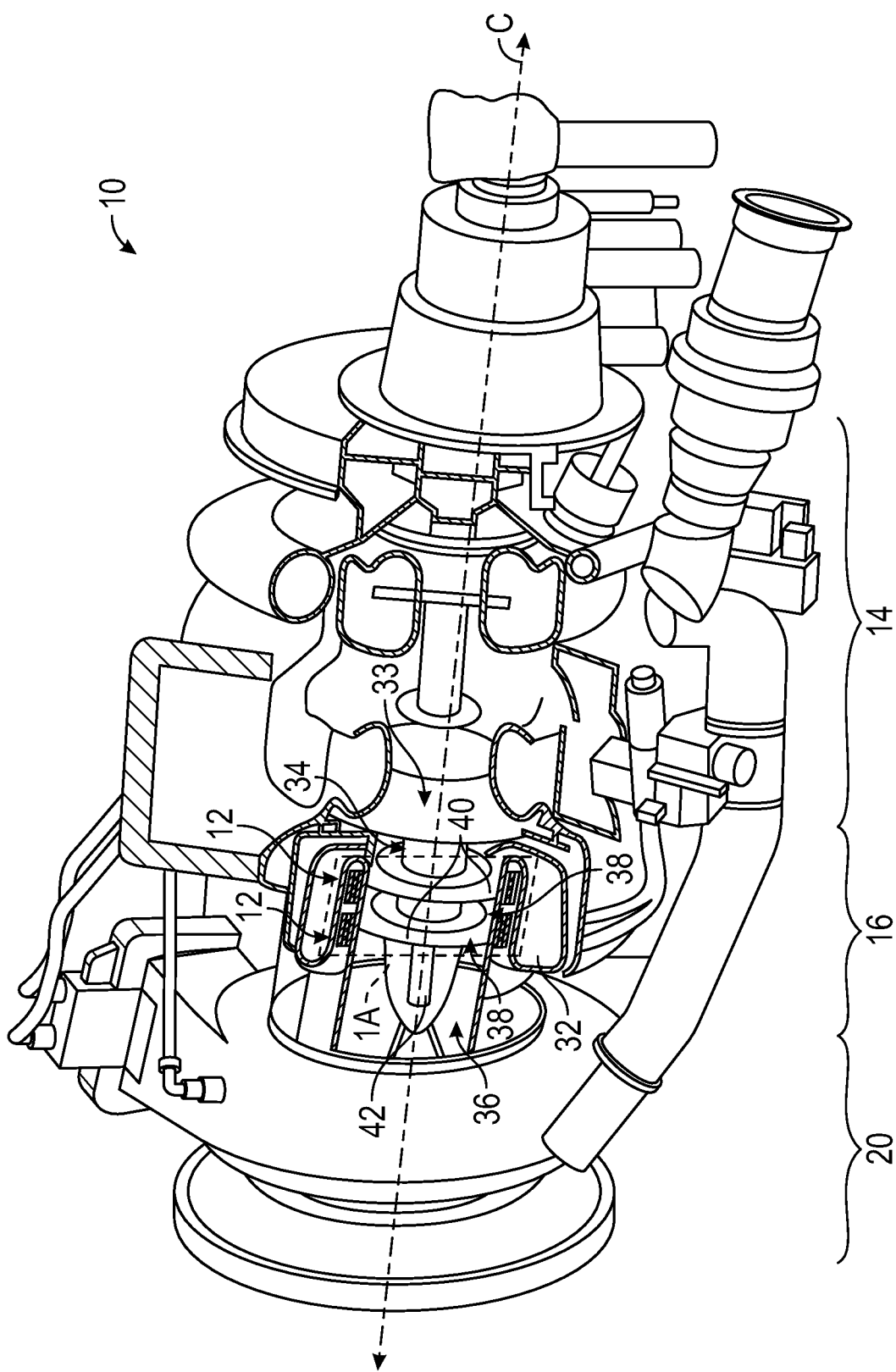
FIG. 1 is a partially cut-away schematic illustration of a gas turbine engine that includes a containment system in accordance with various embodiments.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of structure or device requiring containment during operation, and that the example of a gas turbine engine having a compressor and a turbine is merely one exemplary embodiment according to the present disclosure. In addition, while the containment system is described herein as being used with a gas turbine engine onboard a mobile platform, such as a bus, motorcycle, train, motor vehicle, marine vessel, aircraft, rotorcraft and the like, the various teachings of the present disclosure can be used with a gas turbine engine on a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominately in the respective nominal axial or radial direction. As used herein, the term "transverse" denotes an axis that crosses another axis at an angle such that the axis and the other axis are neither substantially perpendicular nor substantially parallel. Also as used herein, the terms "integrally formed" and "integral" mean one-piece and exclude brazing, fasteners, or the like for maintaining portions thereon in a fixed relationship as a single unit.

With reference to FIG. 1, an exemplary gas turbine engine 10 is shown, which includes a containment system 12 according to various embodiments. It should be noted that the use of the containment system 12 with the gas turbine engine 10 is merely exemplary, as the containment system 12 described and illustrated herein can be employed to contain any suitable rotating structure, such as stationary axial compressors, stationary turbines, etc. In this example, the gas turbine engine 10 serves as an auxiliary power unit for power generation, and includes a compressor section 14, a combustion section and turbine section 16, and an exhaust section 20. Generally, the gas turbine engine 10 has a rotational axis, which is a center axis C of the gas turbine engine 10. In one example, the containment system 12 is employed with the gas turbine engine 10 to provide containment for a rotating component of the gas turbine engine 10. It should be noted that while the containment system 12 is described and illustrated herein as being employed with the gas turbine engine 10, such an auxiliary power unit, the containment system 12 described herein according to various embodiments can be employed with a gas turbine propulsion engine, such as a turbofan engine. It should be noted that although the figures shown herein depict an example with certain arrangements of elements, additional intervening elements, devices, features, or components may be present in an actual embodiment. It should also be understood that the figures are merely illustrative and may not be drawn to scale.

With reference to FIG. 1, the compressor section 14 includes at least one compressor, which draws air into the gas turbine engine 10 and raises the static pressure of the air. In the example of FIG. 1, the compressor section 14 includes at least one shaft mounted compressor. While not illustrated herein, a rotor associated with the at least one compressor can be surrounded or substantially surrounded by the containment system 12 according to various embodiments to contain a disk and/or blades associated with the rotor of the compressor during the operation of the compressor. It should be noted that while the compressor section 14 is illustrated in FIG. 1 as including a gearbox, the compressor section 14 need not include a gearbox.

The combustion section and turbine section 16 of gas turbine engine 10 includes a combustor 32 in which the high pressure air from the compressor section 14 is mixed with fuel and combusted to generate a combustion mixture of air and fuel. The combustion mixture is then directed into the turbine section 33. In this example, with reference to FIG. 1A, the turbine section 33 includes one or more turbines disposed in axial flow series. In one example, the turbine section 33 includes two turbines; a first stage turbine 34 and a second stage turbine 36. While two turbines are depicted, it is to be understood that any number of turbines may be included. Each of the turbines 34, 36 includes a turbine disk 38, and the turbine disk 38 includes one or more turbine blades 40. With reference back to FIG. 1, the turbine disks 38 can be coupled to a power shaft 42 (FIG. 1). The combustion mixture from the combustor 32 expands through each turbine 34, 36, causing the turbine disks 38 to rotate. The combustion mixture is then exhausted through the exhaust section 20. As the turbines 34, 36 rotate, the turbines 34, 36 rotate the power shaft 42, which may be used to drive various devices or components within the gas turbine engine 10 and/or a vehicle incorporating the gas turbine engine 10. As will be discussed in further detail herein, one or more of the turbines 34, 36 is substantially surrounded by the containment system 12 according to various embodiments to contain the respective turbine disk 38 and/or turbine blades 40 during the operation of the respective turbine 34, 36. Thus, the compressor and the turbines 34, 36 of the gas turbine engine 10 comprise rotating components of the gas turbine engine 10 for which the containment system 12 may be positioned about to provide energy absorption and containment during an event.

Figure 1A:
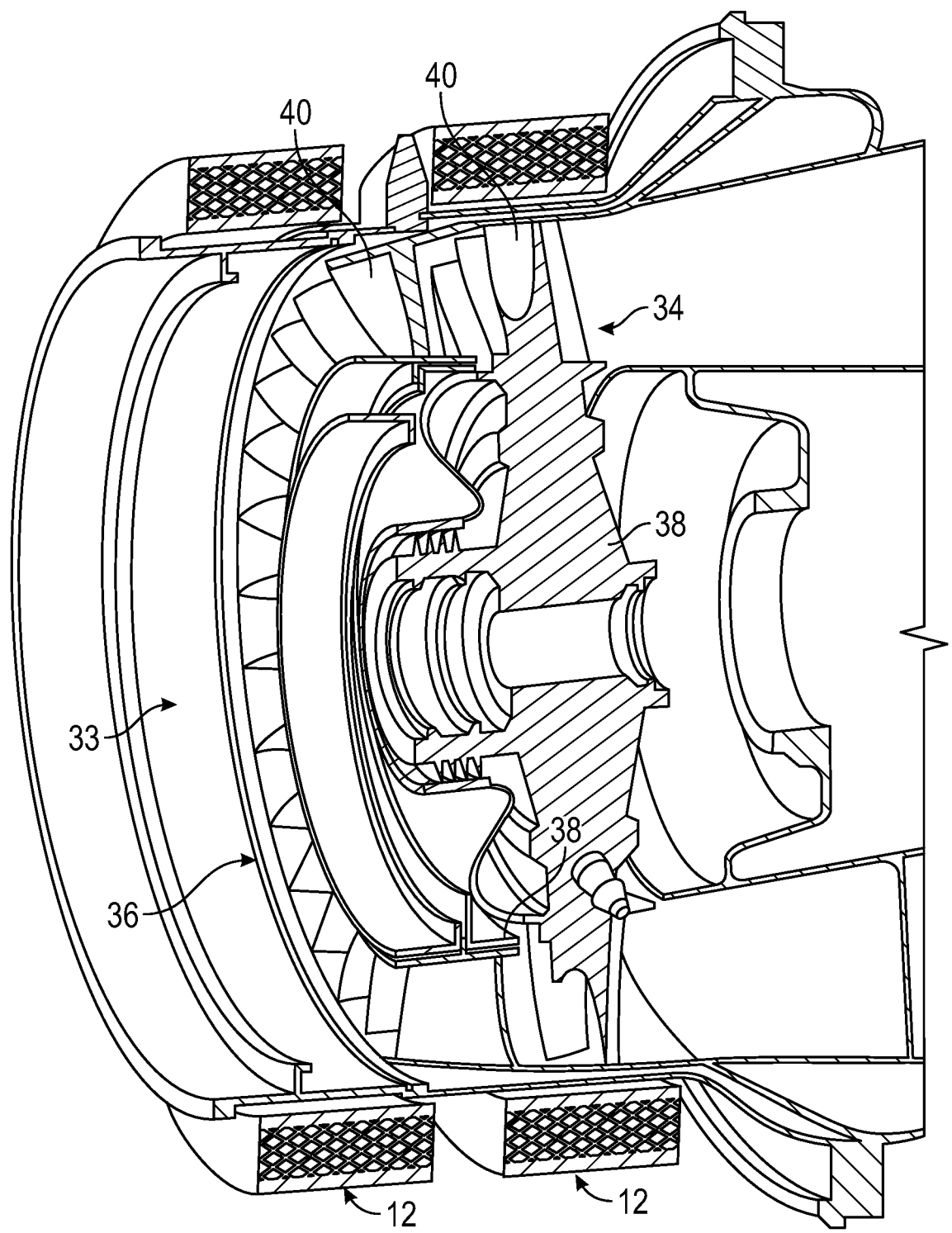
FIG. 1A is a simplified detail partially cut-away schematic illustration of a turbine section of the gas turbine engine of FIG. 1, taken from detail 1A in FIG. 1, which includes the containment system in accordance with various embodiments.
Figure 2:
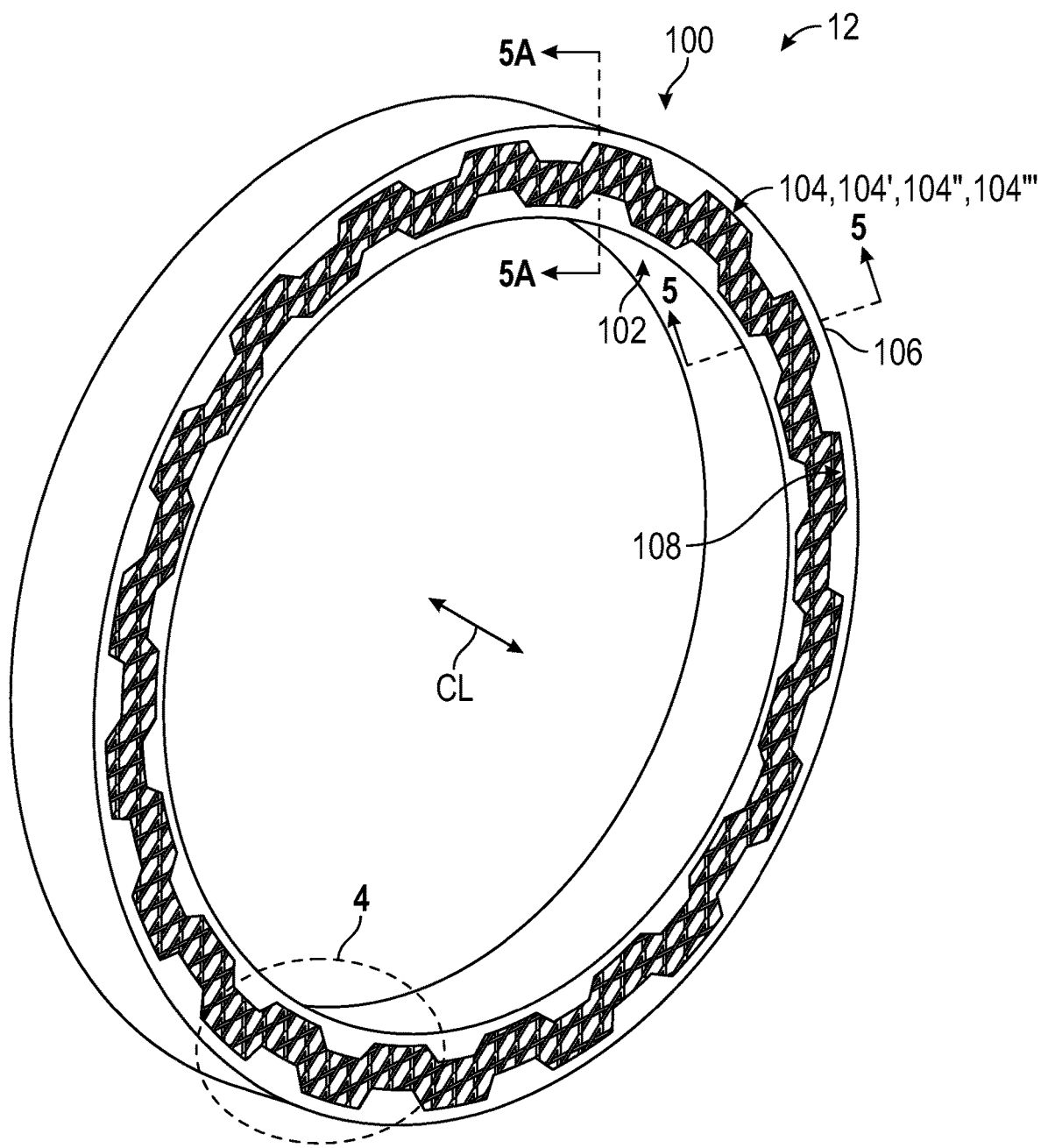
FIG. 2 is a perspective view of the exemplary containment system for use with the gas turbine engine of FIG. 1 in accordance with various embodiments.

With reference to FIG. 2, a perspective view of the containment system 12 according to various teachings of the present disclosure is shown. The containment system 12 comprises a first or outer containment ring 100, a second or inner containment ring 102 and a lattice 104 that interconnects and is integrally formed with the outer containment ring 100 and the inner containment ring 102. In this example, the outer containment ring 100 is spaced apart from the inner containment ring 102 by the lattice 104, and the containment system 12 surrounds a portion of the gas turbine engine 10 (FIG. 1A). The outer containment ring 100 and in the inner containment ring 102 are shown and described herein as comprising annular rings, however, it will be understood that the outer containment ring 100 and the inner containment ring 102 may have any desired polygonal shape, such as rectangular, square, etc., to surround the one or more components of the gas turbine engine 10, including, but not limited to the turbines 34, 36. Thus, the use of the term "rings" is not intended to limit the structure of the outer containment ring 100 and the inner containment ring 102 to a ring shape, but rather, any suitable polygonal shape may be employed for the containment system 12.

Figure 3:
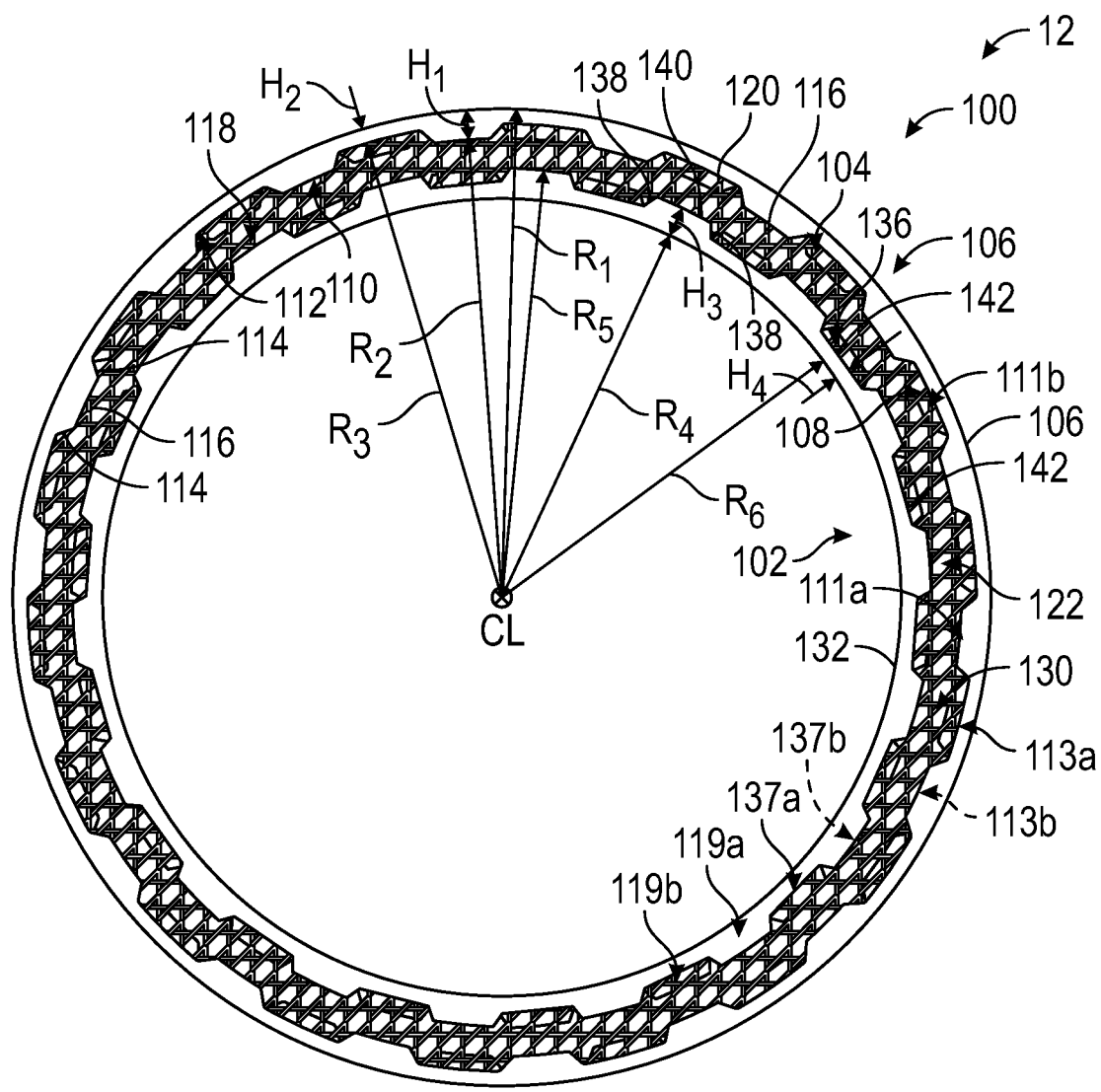
FIG. 3 is a front view of the containment system of FIG. 2, in which the containment system is in a first, expanded state.

In this example, the outer containment ring 100 is concentric with the inner containment ring 102, and shares a center line CL with the inner containment ring 102. In one example, the center line CL is on the rotational axis or central axis C of the gas turbine engine 10 (FIG. 1). With reference to FIG. 2, the outer containment ring 100 has an outer, first surface 106 and an opposite inner, second surface 108. The outer containment ring 100 is composed of a metal or metal alloy, including, but not limited to aluminum, nickel alloy (for example, nickel alloy 718, nickel alloy 625, etc.), titanium alloys (for example, 6-2-4-2 titanium alloy, etc.) or steel. The outer containment ring 100 is formed through additive manufacturing, including, but not limited to direct metal laser sintering (DMLS), laser powder bed fusion (L-PBF), electron powder bed fusion (E-PBF) or electron beam melting (EBM). The first surface 106 defines an outer perimeter or circumference of the containment system 12, and is substantially smooth and uniform. With reference to FIG. 3, the outer containment ring 100 has a first radius R1, which is defined between a point on the center line CL and the first surface 106.

Figure 5:
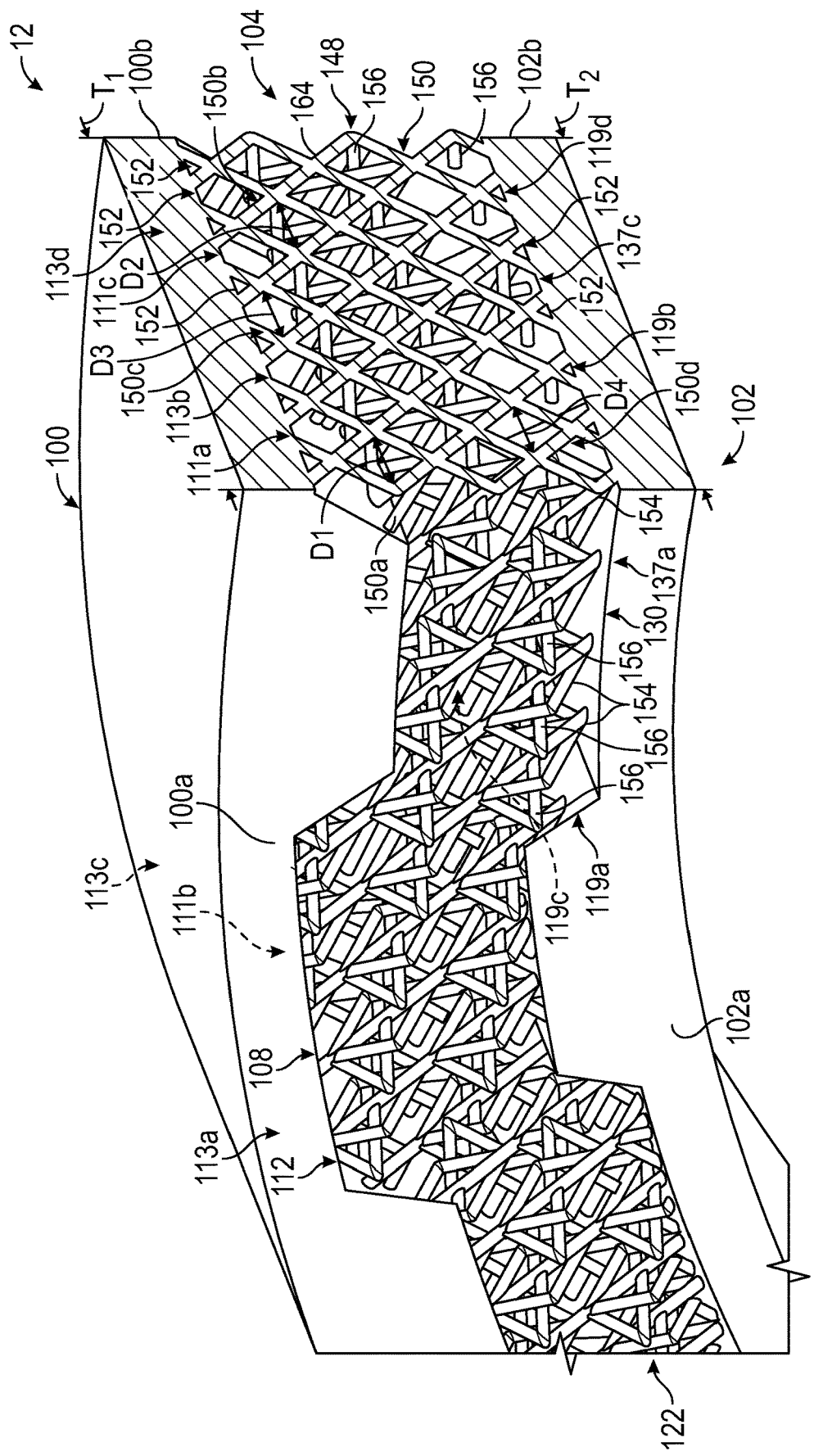
FIG. 5 is a cross-sectional view of the containment system of FIG. 2, taken along line 5-5 of FIG. 2.
Figure 5A:
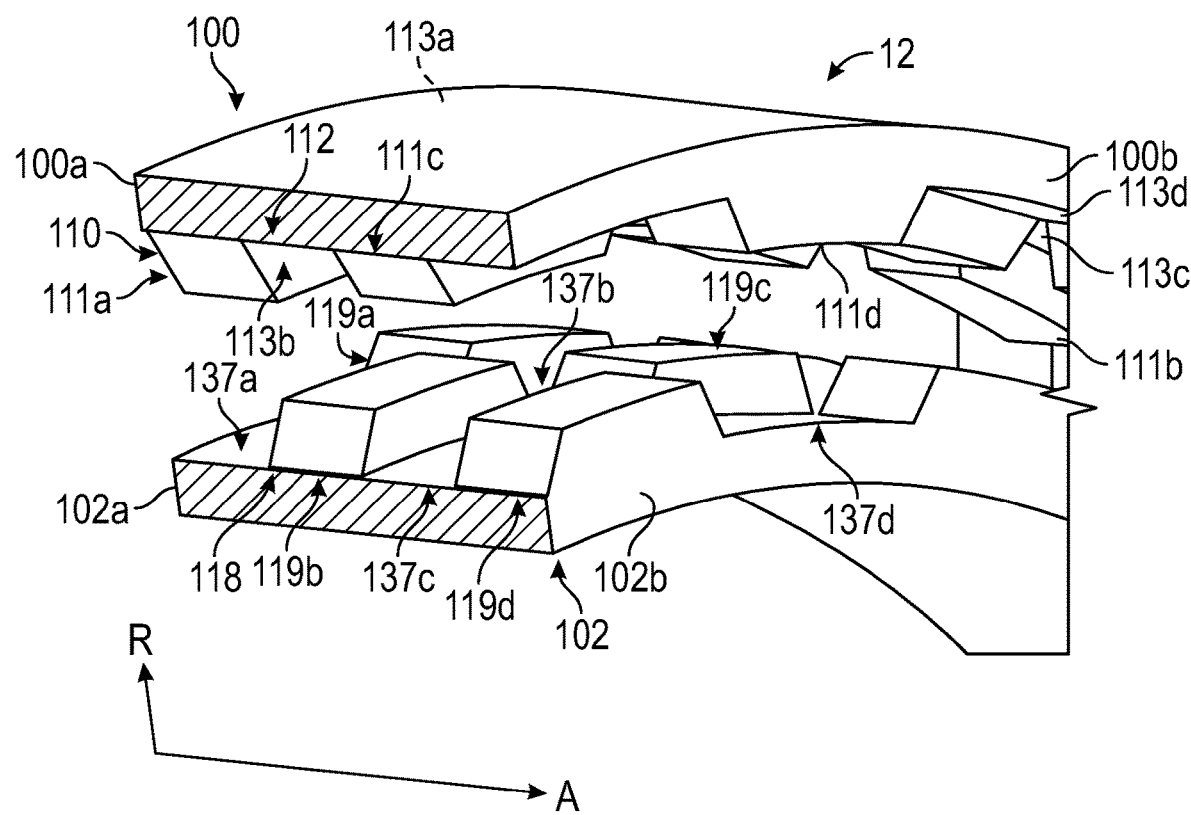
FIG. 5A is a cross-sectional view of the containment system of FIG. 2, taken along line 5A-5A of FIG. 2, in which the lattice has been removed to illustrate a position of a plurality of first projections of an outer containment ring and a plurality of second projections of an inner containment ring.

With continued reference to FIG. 3, the second surface 108 includes at least one or a plurality of first projections 110. In this example, the second surface 108 includes a plurality of discrete first projections 110 in a substantially undulating pattern about a circumference of the outer containment ring 100. The undulating pattern of the plurality of first projections 108, in this example, repeats axially along the circumference of the outer containment ring 100 such that a first circumferential sub-ring 111a of the first projections 110 is offset from a second circumferential sub-ring 111b of the first projections 110. With reference to FIG. 5A, the containment system 12 is shown with the lattice 104 removed to more clearly illustrate the arrangement of the first projections 110 of the outer containment ring 100 and at least one or a plurality of second projections 118 of the inner containment ring 102. In this example, as shown in FIG. 5A, the plurality of first projections 110 are arranged about the circumference of the outer containment ring 100 in about four sub-rings 111a, 111b, 111c, 111d that are offset from each other and spaced apart in an axial direction A from a first side 100a of the outer containment ring 100 to a second side 100b of the outer containment ring 100. The first sub-ring 111a is offset from the second sub-ring 111b such that each of the first projections 110 of the first sub-ring 111a is misaligned with each of the first projections 110 of the second sub-ring 111b. The second sub-ring 111b is offset from the third sub-ring 111c such that each of the first projections 110 of the second sub-ring 111b is misaligned with each of the first projections 110 of the third sub-ring 111c. The third sub-ring 111c is offset from the fourth sub-ring 111d such that each of the first projections 110 of the third sub-ring 111c is misaligned with each of the first projections 110 of the fourth sub-ring 111d.

With reference back to FIG. 3, the first projections 110 are spaced apart about a perimeter or the circumference of the outer containment ring 100 to define a plurality of first reliefs 112, with each first relief 112 defined between adjacent ones of the first projections 110. In this example, the first projections 110 are spaced evenly about the circumference of the outer containment ring 100, however, it will be understood that the first projections 110 may be unevenly spaced. Each of the first projections 110 extends radially inward and toward the inner containment ring 102. In one example, each of the first projections 110 is defined by a pair of tapered sidewalls 114 that are interconnected by a surface 116. Each of the surfaces 116 of the first projections 110 has a second radius R2 from a point on the center line CL, which is less than the first radius R1. Each of the first projections 110 has a thickness or radial height H1 that is defined by the difference between the first radius R1 and the second radius R2. It should be noted that the first projections 110 may have any desired shape, and the sidewalls 114 may terminate in a line instead of the surface 116 to form pointed teeth, if desired.

With continued reference to FIG. 3, each of the first reliefs 112 has a relief surface 120, which is substantially smooth and sized to cooperate with the plurality of second projections 118 of the inner containment ring 102. In this example, given the pattern of the first projections 110, the first reliefs 112, which are defined between the first projections 110, also repeat axially along the circumference of the outer containment ring 100 such that a first circumferential sub-ring 113a of the first reliefs 112 is offset from a second circumferential sub-ring 113b of the first reliefs 112. With reference to FIGS. 5 and 5A, the plurality of first reliefs 112 are arranged about the circumference of the outer containment ring 100 in about four sub-rings 113a, 113b, 113c, 113d that are offset from each other and spaced apart in the axial direction A from the first side 100a of the outer containment ring 100 to the second side 100b of the outer containment ring 100.

With reference back to FIG. 3, each of the relief surfaces 120 of the first reliefs 112 has a third radius R3 from a point on the center line CL, which is less than the first radius R1. Each of the first reliefs 112 has a thickness or second radial height H2 that is defined by the difference between the first radius R1 and the third radius R3. The second radial height H2 is less than the first radial height H1. It should be noted that the first reliefs 112 may have any desired shape, and may define a pointed indention to cooperate with pointed teeth, if desired.

As will be discussed, with continued reference to FIG. 3, in a first, expanded state, each of the plurality of second projections 118 is spaced apart from each of the relief surfaces 120 to define a chamber 122 that contains the lattice 104. In a second, collapsed state (FIGS. 11A and 11B), each of the second projections 118 is proximate to, substantially contacts or contacts a respective one of the relief surfaces 120 in the area of an applied force such that the first projections 110 interlock with the second projections 118 and the lattice 104, including the chamber 122, is substantially collapsed or collapsed to absorb energy during a containment event.

In this example, referring to FIG. 3, the inner containment ring 102 has an outer, third surface 130 and an opposite inner, fourth surface 132. The inner containment ring 102 is composed of a metal or metal alloy, including, but not limited to aluminum, nickel alloy (for example, nickel alloy 718, nickel alloy 625, etc.), titanium alloys (for example, 6-2-4-2 titanium alloy, etc.) or steel. The inner containment ring 102 is formed through additive manufacturing, including, but not limited to direct metal laser sintering (DMLS), laser powder bed fusion (L-PBF), electron powder bed fusion (E-PBF) or electron beam melting (EBM). The fourth surface 132 defines an inner perimeter or inner circumference of the containment system 12, and is substantially smooth and uniform. The inner containment ring 102 has a fourth radius R4, which is defined between a point on the center line CL and the fourth surface 132.

With continued reference to FIG. 3, the third surface 130 includes at least one or a plurality of discrete second projections 118. In this example, the third surface 130 includes a plurality of the second projections 118 in a substantially undulating pattern about a circumference of the inner containment ring 102. The undulating pattern of the plurality of second projections 118, in this example, repeats axially along the circumference of the inner containment ring 102 such that a first circumferential sub-ring 119a of the second projections 118 is offset from a second circumferential sub-ring 119b of the second projections 118. With reference to FIGS. 5 and 5A, the plurality of second projections 118 are arranged about the circumference of the inner containment ring 102 in about four sub-rings 119a, 119b, 119c, 119d that are offset from each other and spaced apart in the axial direction A from a first side 102a of the inner containment ring 102 to a second side 102b of the inner containment ring 102. The first sub-ring 119a is offset from the second sub-ring 119b such that each of the second projections 118 of the first sub-ring 119a is misaligned with each of the second projections 118 of the second sub-ring 119b. The second sub-ring 119b is offset from the third sub-ring 119c such that each of the second projections 118 of the second sub-ring 119b is misaligned with each of the second projections 118 of the third sub-ring 119c. The third sub-ring 119c is offset from the fourth sub-ring 119d such that each of the second projections 118 of the third sub-ring 119c is misaligned with each of the second projections 118 of the fourth sub-ring 119d.

With reference back to FIG. 3, the second projections 118 are spaced apart about a perimeter or the circumference of the inner containment ring 102 to define a plurality of second reliefs 136, with each second relief 136 defined between adjacent ones of the second projections 118. In this example, the second projections 118 are spaced evenly about the circumference of the inner containment ring 102, however, it will be understood that the second projections 118 may be unevenly spaced to cooperate with uneven spacing of the first projections 110. Each of the second projections 118 extends radially outward and toward the outer containment ring 100. Each of the second projections 118 are offset and spaced apart from each of the first projections 110 to define the chamber 122 in the first, expanded state. Once an applied force exceeds a pre-defined threshold force, the lattice 104 collapses, which causes the inner containment ring 102 to move toward the outer containment ring 100. As will be discussed, the collapse of the lattice 104 moves the containment system 12 from the first, expanded state to the second, interlocked state. In the second, interlocked state, in which the lattice 104 has collapsed, each of the second projections 118 interlock with the first projections 110 in the area of the applied force.

In one example, with reference to FIG. 3, each of the second projections 118 is defined by a second pair of tapered sidewalls 138 that are interconnected by a second surface 140. Each of the second surfaces 140 has a fifth radius R5 from a point on the center line CL, which is greater than the fourth radius R4. Each of the second projections 118 has a thickness or third radial height H3 that is defined by the difference between the fifth radius R5 and the fourth radius R4. In one example, the third radial height H3 is the same as the radial height H1. It should be noted that the second projections 118 may have any desired shape, and the second sidewalls 138 may terminate in a line instead of the second surface 140 to form pointed teeth, if desired.

With continued reference to FIG. 3, each of the second reliefs 136 has a second relief surface 142, which is substantially smooth and sized to cooperate with the plurality of first projections 110 of the outer containment ring 100. In this example, given the pattern of the second projections 118, the second reliefs 136, which are defined between the second projections 118, also repeat axially along the circumference of the inner containment ring 102 such that a first circumferential sub-ring 137a of the second reliefs 136 is offset from a second circumferential sub-ring 137b of the second reliefs 136. With reference to FIGS. 5 and 5A, the plurality of second reliefs 136 are arranged about the circumference of the inner containment ring 102 in about four sub-rings 137a, 137b, 137c, 137d that are offset from each other and spaced apart in the axial direction A from the first side 102a of the inner containment ring 102 to the second side 102b of the inner containment ring 102. It should be noted that the use of four circumferential sub-rings 111a-111d; 113a-113d; 119a-119b; 137a-137b for each of the outer containment ring 100 and the inner containment ring 102 is merely exemplary, as the outer containment ring 100 and the inner containment ring 102 may include any number of circumferential sub-rings 111a-111d; 113a-113d; 119a-119b; 137a-137b from about one circumferential sub-ring to more than four circumferential sub-rings from the first side 100a to the second side 100b and the first side 102a to the second side 102b, respectively.

With reference to FIG. 3, each of the second relief surfaces 142 of the second reliefs 136 has a sixth radius R6 from a point on the center line CL, which is less than the fifth radius R5 and greater than the fourth radius R4. Each of the second reliefs 136 has a thickness or fourth radial height H4 that is defined by the difference between the sixth radius R6 and the fourth radius R4. The fourth radial height H4 is less than the third radial height H3. In one example, the fourth radial height H4 is the same as the second radial height H2. It should be noted that the second reliefs 136 may have any desired shape, and may define a pointed indention to cooperate with pointed teeth, if desired.

It should be noted that in other embodiments, the plurality of first projections 110 of the outer containment ring 100 and the plurality of second projections 118 of the inner containment ring 102 may be configured differently. In one example, with reference to FIG. 3A, the containment system 12 is shown with an outer containment ring 100', an inner containment ring 102' and the lattice 104 that interconnects and is integrally formed with the outer containment ring 100' and the inner containment ring 102'. The outer containment ring 100' is concentric with the inner containment ring 102', and shares the center line CL with the inner containment ring 102'. The outer containment ring 100' has the first surface 106 and an opposite inner, second surface 108'. The outer containment ring 100' is composed of a metal or metal alloy, including, but not limited to aluminum, nickel alloy (for example, nickel alloy 718, nickel alloy 625, etc.), titanium alloys (for example, 6-2-4-2 titanium alloy, etc.) or steel. The outer containment ring 100' is formed through additive manufacturing, including, but not limited to direct metal laser sintering (DMLS), laser powder bed fusion (L-PBF), electron powder bed fusion (E-PBF) or electron beam melting (EBM).

Figure 3A:
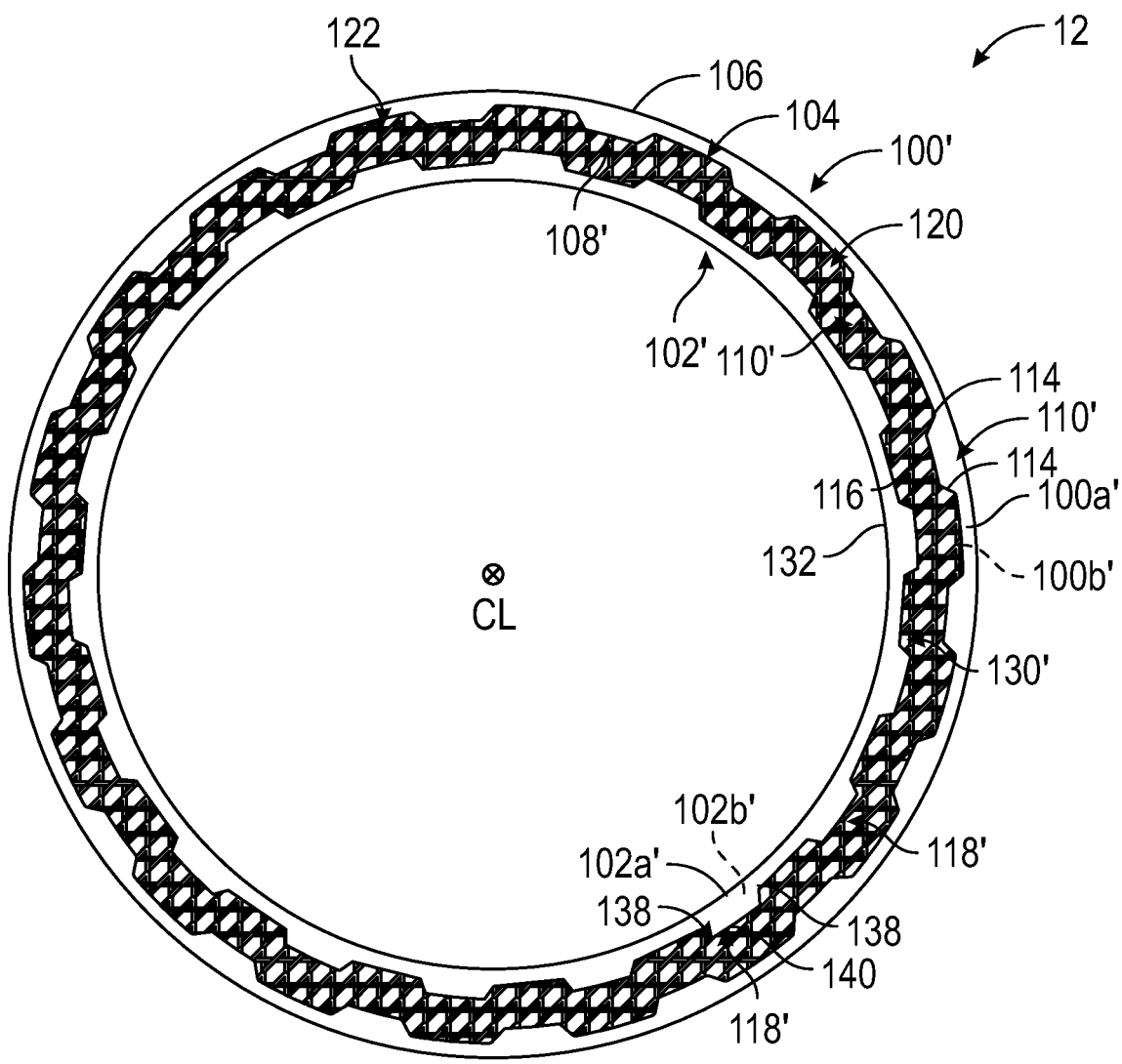
FIG. 3A is a front view of another exemplary containment system for use with the gas turbine engine of FIG. 1 in accordance with various embodiments.

With continued reference to FIG. 3A, the second surface 108' includes at least one or a plurality of first projections 110'. In this example, the second surface 108' includes a plurality of first projections 110' in a substantially undulating pattern about a circumference of the outer containment ring 100'. In the example of FIG. 3A, each of the first projections 110' extends from a first side 100a' of the outer containment ring 100' to an opposite second side 100b' of the outer containment ring 100'. Thus, in this example, each of the first projections 110' extend axially from the first side 100a' to the second side 100b' uniformly. The first projections 110' are spaced apart about a perimeter or the circumference of the outer containment ring 100' to define a plurality of first reliefs 112', with each first relief 112' defined between adjacent ones of the first projections 110'. In this example, the first projections 110' are spaced evenly about the circumference of the outer containment ring 100', however, it will be understood that the first projections 110' may be unevenly spaced. Each of the first projections 110' extends radially inward and toward the inner containment ring 102'. In one example, each of the first projections 110' is defined by the pair of tapered sidewalls 114 that are interconnected by the surface 116. It should be noted that the first projections 110' may have any desired shape, and the sidewalls 114 may terminate in a line instead of the surface 116 to form pointed teeth, if desired. Each of the first reliefs 112' has the relief surface 120, which is substantially smooth and sized to cooperate with at least one or a plurality of second projections 118' of the inner containment ring 102'.

With continued reference to FIG. 3A, in a first, expanded state, each of the plurality of second projections 118' is spaced apart from each of the relief surfaces 120 to define the chamber 122 that contains the lattice 104. In a second, collapsed state, each of the second projections 118' is proximate to, substantially contacts or contacts a respective one of the relief surfaces 120 in the area of the applied force such that the first projections 110' interlock with the second projections 118' and the lattice 104, including the chamber 122, is substantially collapsed or collapsed to absorb energy during a containment event.

In this example, referring to FIG. 3A, the inner containment ring 102' has an outer, third surface 130' and the fourth surface 132. The inner containment ring 102' is composed of a metal or metal alloy, including, but not limited to aluminum, nickel alloy (for example, nickel alloy 718, nickel alloy 625, etc.), titanium alloys (for example, 6-2-4-2 titanium alloy, etc.) or steel. The inner containment ring 102' is formed through additive manufacturing, including, but not limited to direct metal laser sintering (DMLS), laser powder bed fusion (L-PBF), electron powder bed fusion (E-PBF) or electron beam melting (EBM). With continued reference to FIG. 3A, the third surface 130' includes at least one or a plurality of the second projections 118'. In this example, the third surface 130' includes a plurality of the second projections 118' in a substantially undulating pattern about a circumference of the inner containment ring 102'. In the example of FIG. 3A, each of the second projections 118' extends from a first side 102a' of the inner containment ring 102' to an opposite second side 102b' of the inner containment ring 102'. Thus, in this example, each of the second projections 118' extend axially from the first side 102a' to the second side 102b' uniformly.

With reference back to FIG. 3A, the second projections 118' are spaced apart about a perimeter or the circumference of the inner containment ring 102' to define a plurality of second reliefs 136', with each second relief 136' defined between adjacent ones of the second projections 118'. In this example, the second projections 118' are spaced evenly about the circumference of the inner containment ring 102', however, it will be understood that the second projections 118' may be unevenly spaced to cooperate with uneven spacing of the first projections 110'. Each of the second projections 118' extends radially outward and toward the outer containment ring 100'. Each of the second projections 118' are offset and spaced apart from each of the first projections 110' to define the chamber 122 in the first, expanded state. Once an applied force exceeds a pre-defined threshold force, the lattice 104 collapses, which causes the inner containment ring 102' to move toward the outer containment ring 100'. As will be discussed, the collapse of the lattice 104 moves the containment system 12 from the first, expanded state to the second, interlocked state. In the second, interlocked state, in which the lattice 104 has collapsed, each of the second projections 118' interlock with the first projections 110' in the area of the applied force. In one example, with reference to FIG. 3A, each of the second projections 118' is defined by the second pair of tapered sidewalls 138 that are interconnected by the second surface 140. It should be noted that the second projections 118' may have any desired shape, and the second sidewalls 138 may terminate in a line instead of the second surface 140 to form pointed teeth, if desired. With continued reference to FIG. 3A, each of the second reliefs 136' has the second relief surface 142, which is substantially smooth and sized to cooperate with the plurality of first projections 110' of the outer containment ring 100'. It should be noted that the second reliefs 136' may have any desired shape, and may define a pointed indention to cooperate with pointed teeth, if desired.

Figure 4:
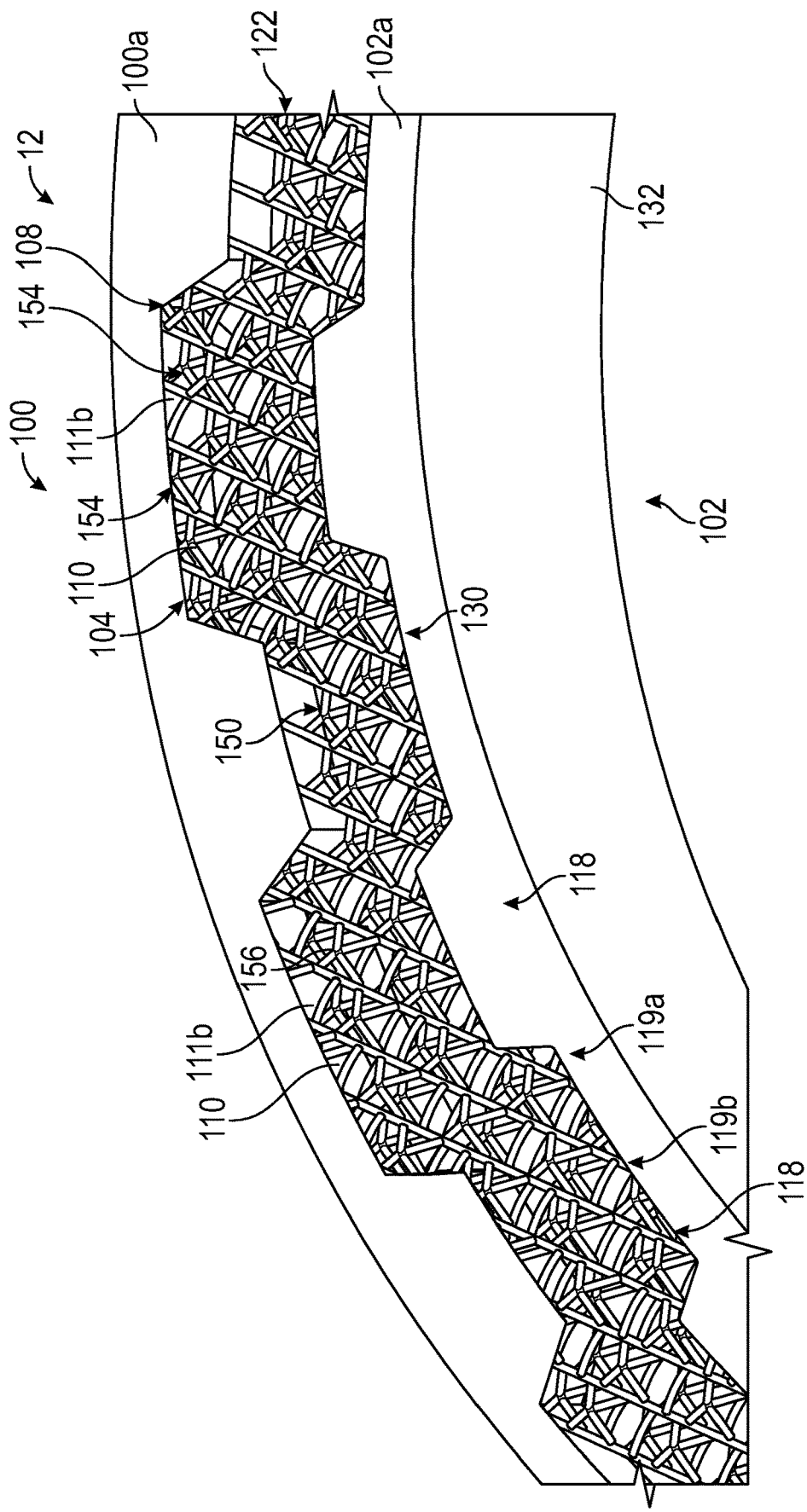
FIG. 4 is a detail view of a portion of the containment system of FIG. 2, taken at detail 4 of FIG. 2.

With reference back to FIG. 3, the lattice 104 is defined within the chamber 122 and spans the chamber 122. Stated another way, the lattice 104 is defined between the outer containment ring 100 and the inner containment ring 102, and interconnects the inner containment ring 102 with the outer containment ring 100. Generally, with reference to FIG. 4, the lattice 104 is defined between the third surface 130 of the inner containment ring and the second surface 108 of the outer containment ring 100.

With reference to FIG. 5, the outer containment ring 100 has a thickness T1 in the axial direction A (in coordinate system 160), the inner containment ring 102 has a thickness T2 in the axial direction A, and the lattice 104 spans the entirety of the chamber 122 defined between the outer containment ring 100 and the inner containment ring 102 in both a radial direction R and the axial direction A. The lattice 104 is composed of a metal or metal alloy, including, but not limited to aluminum, nickel alloy (for example, nickel alloy 718, nickel alloy 625, etc.), titanium alloys (for example, 6-2-4-2 titanium alloy, etc.) or steel. The lattice 104 is integrally formed with the inner containment ring 102 and the outer containment ring 100 through additive manufacturing, including, but not limited to direct metal laser sintering (DMLS), laser powder bed fusion (L-PBF), electron powder bed fusion (E-PBF) or electron beam melting (EBM). In this example, the outer containment ring 100, the inner containment ring 102 and the lattice 104 are each composed of the same metal or metal alloy material, such as a nickel alloy. In one example, with continued reference to FIG. 5, the lattice 104 is formed of a repeating pattern 148 of a polygonal shape, such as a rhombus 150, which is porous or defines openings. The porosity or openings defined by the lattice 104 reduces a weight of the containment system 12 and provides a mass savings. As shown, the pattern 148 of the rhombus 150 is arranged in columns 152, which are interconnected. The columns 152 are spaced apart about the chamber 122 so as to extend in spaced apart rows 154 about the perimeter or circumference of the inner containment ring 102. One or more rods 156 may extend between and interconnect the adjacent rows 154.

With continued reference to FIG. 5, the lattice 104 extends axially (in the axial direction A in the coordinate system 160) from the first side 102a of the inner containment ring 102 and the first side 100a of the outer containment ring 100 to the opposite, second side 102a of the inner containment ring 102 and the opposite, second side 100b of the outer containment ring 100, respectively. The lattice 104 extends radially (in the radial direction R in the coordinate system 160) between the third surface 130 of the inner containment ring 102 and the second surface 108 of the outer containment ring 100. In the example of FIG. 5, the lattice 104 extends with a uniform density of the pattern 148 axially and radially. Stated another way, in FIG. 5, the lattice 104 extends uniformly in the chamber 122 about the circumference of the inner containment ring 102. In this regard, as shown, a rhombus 150a near or at the first end 100a, 102a has a distance D1 and a rhombus 150b near the second end 100b, 102b has a distance D2. As used herein, a distance of a rhombus is a distance measured at right angles between two sides of the rhombus. In this example, the distance D2 is the same as the distance D1. A rhombus 150c near or at the second surface 108 has a distance D3 and a rhombus 150d near the third surface 130 has a distance D4. In this example, the distance D3 is the same as the distance D4. Generally, the lattice 104 is configured to withstand a pre-defined or pre-determined threshold force before fracturing or collapsing. Once an applied force exceeds the threshold force, the lattice 104 collapses, which causes the inner containment ring 102 to move toward the outer containment ring 100. As is understood to one skilled in the art, the threshold force that the lattice 104 may withstand is predetermined based on the material of the lattice 104, the structure of the lattice 104, the density of the lattice 104 and the thickness of the inner containment ring 102 and the outer containment ring 100 in relation to the lattice 104, along with the design requirements for the containment system 12 for the particular configuration of the gas turbine engine 10. As will be discussed, the collapse of the lattice 104 moves the containment system 12 from the first, expanded state to the second, interlocked state.

Figure 6:
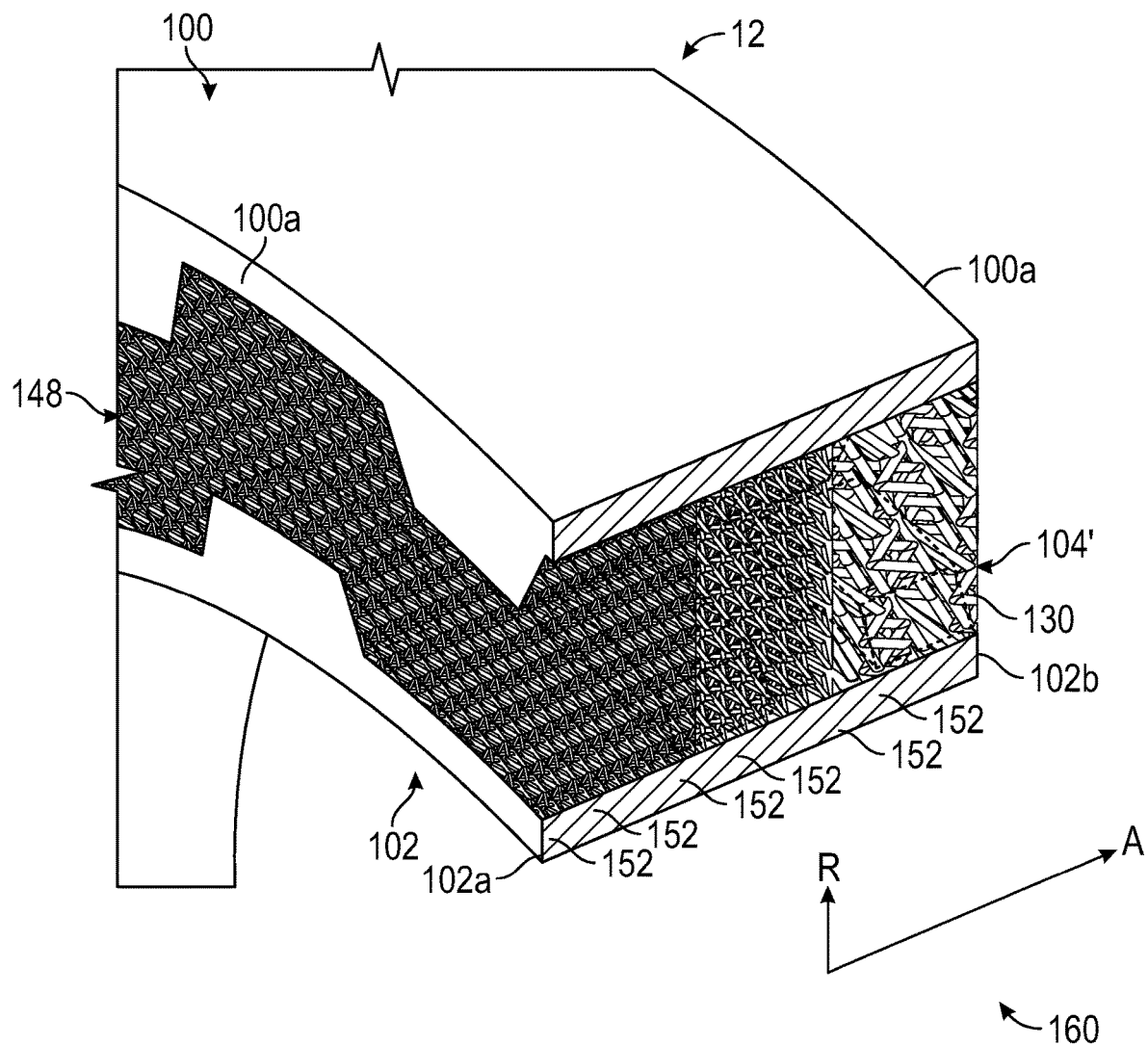
FIG. 6 is a schematic cross-sectional view of another exemplary lattice for the containment system of FIG. 2, taken from the perspective of line 5-5 in FIG. 2, in which a density of a pattern of the lattice varies in an axial direction in accordance with various embodiments.
Figure 7:
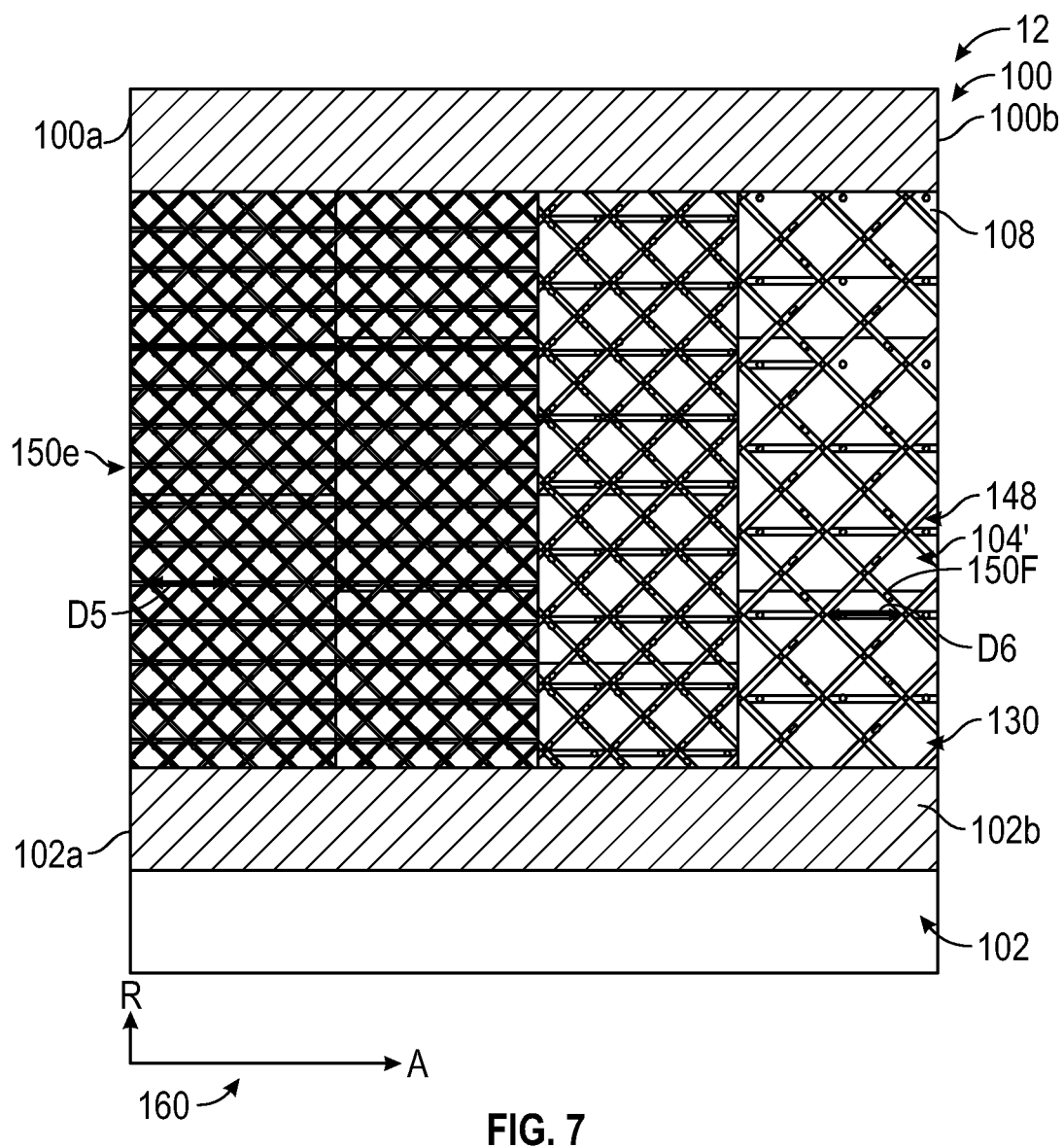
FIG. 7 is a schematic cross-sectional end view of the lattice of FIG. 6.

It should be noted that in other embodiments, the lattice 104 may be configured differently. In one example, with reference to FIGS. 6 and 7, the containment system 12 is shown with a lattice 104'. The lattice 104' has a density of the pattern 148, which varies axially (in the axial direction A). In this example, the density of the pattern 148 is more compact or denser near or at the first end 100a, 102a of the outer containment ring 100 and inner containment ring 102, respectively, and is less compact, less dense or coarse near or at the second end 100b, 102b of the outer containment ring 100 and inner containment ring 102, respectively. With reference to FIG. 7, as shown, a rhombus 150e near or at the first end 100a, 102a has a distance D5 and a rhombus 150f near the second end 100b, 102b has a distance D6. In this example, the distance D6 is different than the distance D5, and the distance D5 is less than the distance D6. Thus, in this example, the density of the pattern 148 decreases from the first end 100a, 102a to the second end 100b, 102b in the axial direction A. This change in density enables the containment system 12 to absorb a greater force near the first end 100a, 102a and in the axial direction A. Generally, the lattice 104' is configured to withstand a pre-defined or pre-determined threshold force before fracturing or collapsing. Once an applied force exceeds the threshold force, the lattice 104' collapses, which causes the inner containment ring 102 to move toward the outer containment ring 100. As is understood to one skilled in the art, the threshold force that the lattice 104' may withstand is predetermined based on the material of the lattice 104', the structure of the lattice 104', the density of the lattice 104' and the thickness of the inner containment ring 102 and the outer containment ring 100 in relation to the lattice 104', along with the design requirements for the containment system 12 for the particular configuration of the gas turbine engine 10. As will be discussed, the collapse of the lattice 104' moves the containment system 12 from the first, expanded state to the second, interlocked state.

Figure 8:
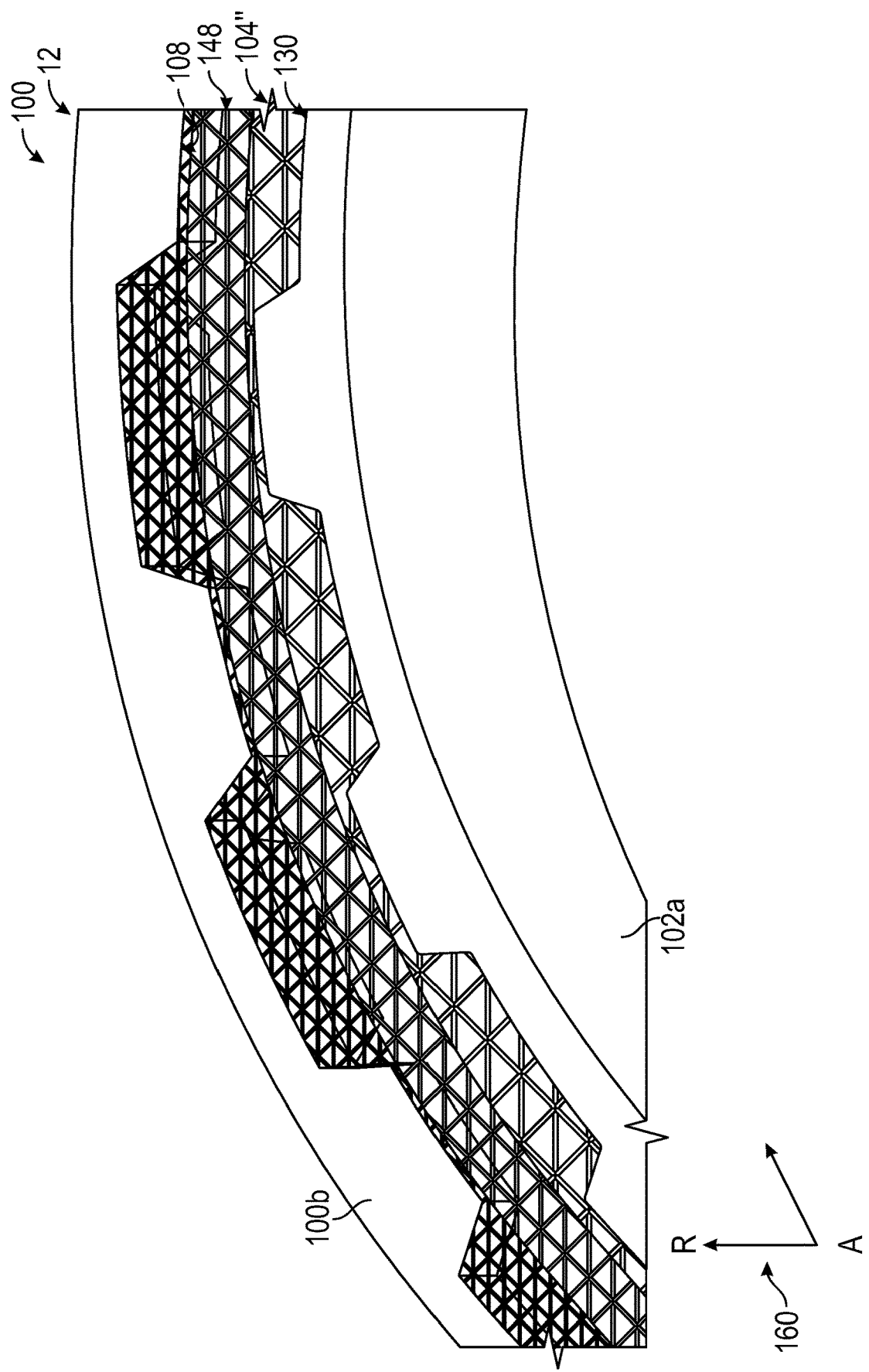
FIG. 8 is a schematic detail view of another exemplary lattice for the containment system of FIG. 2, taken from the perspective of detail 4 in FIG. 2, in which a density of a pattern of the lattice varies in a radial direction in accordance with various embodiments.
Figure 9:
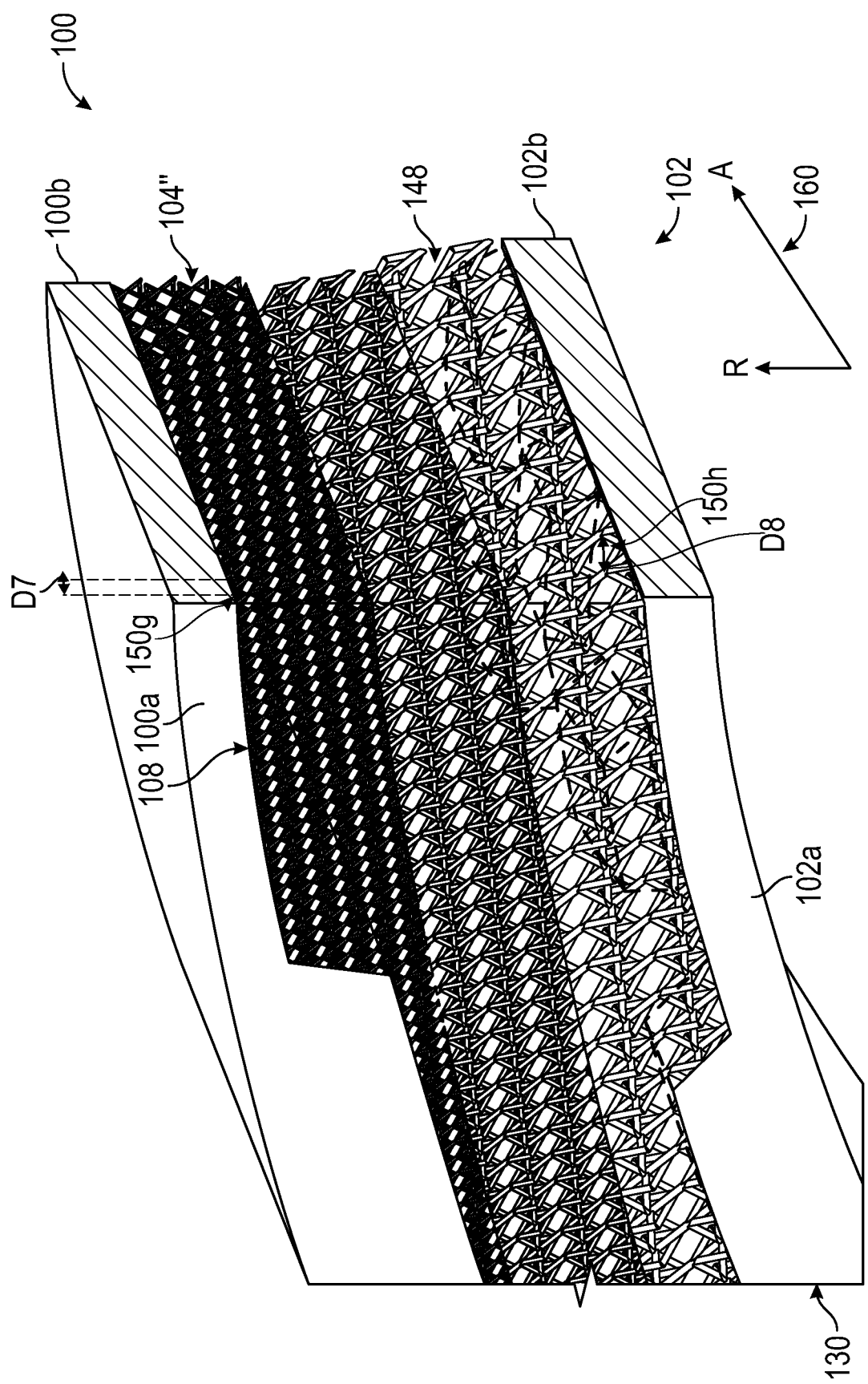
FIG. 9 is a schematic cross-sectional end view of the lattice of FIG. 8.

It should be noted that in still other embodiments, the lattice 104 may be configured differently. In one example, with reference to FIGS. 8 and 9, the containment system 12 is shown with a lattice 104". The lattice 104" has a density of the pattern 148, which varies radially (in the radial direction R). In this example, the density of the pattern 148 is more compact or denser near or at the second surface 108 of the outer containment ring 100 and is less compact, less dense or coarse near or at the third surface 130 of the inner containment ring 102. With reference to FIG. 9, as shown, a rhombus 150g near or at the second surface 108 has a distance D7 and a rhombus 150h near the third surface 130 has a distance D8. In this example, the distance D7 is different than the distance D8, and the distance D7 is less than the distance D8. Thus, in this example, the density of the pattern 148 increases from the third surface 130 to the second surface 108. This change in density enables the containment system 12 to absorb a greater force in the radial direction R. Generally, the lattice 104" is configured to withstand a pre-defined or pre-determined threshold force before fracturing or collapsing. Once an applied force exceeds the threshold force, the lattice 104" collapses, which causes the inner containment ring 102 to move toward the outer containment ring 100. As is understood to one skilled in the art, the threshold force that the lattice 104" may withstand is predetermined based on the material of the lattice 104", the structure of the lattice 104", the density of the lattice 104" and the thickness of the inner containment ring 102 and the outer containment ring 100 in relation to the lattice 104", along with the design requirements for the containment system 12 for the particular configuration of the gas turbine engine 10. As will be discussed, the collapse of the lattice 104" moves the containment system 12 from the first, expanded state to the second, interlocked state.

Figure 10:
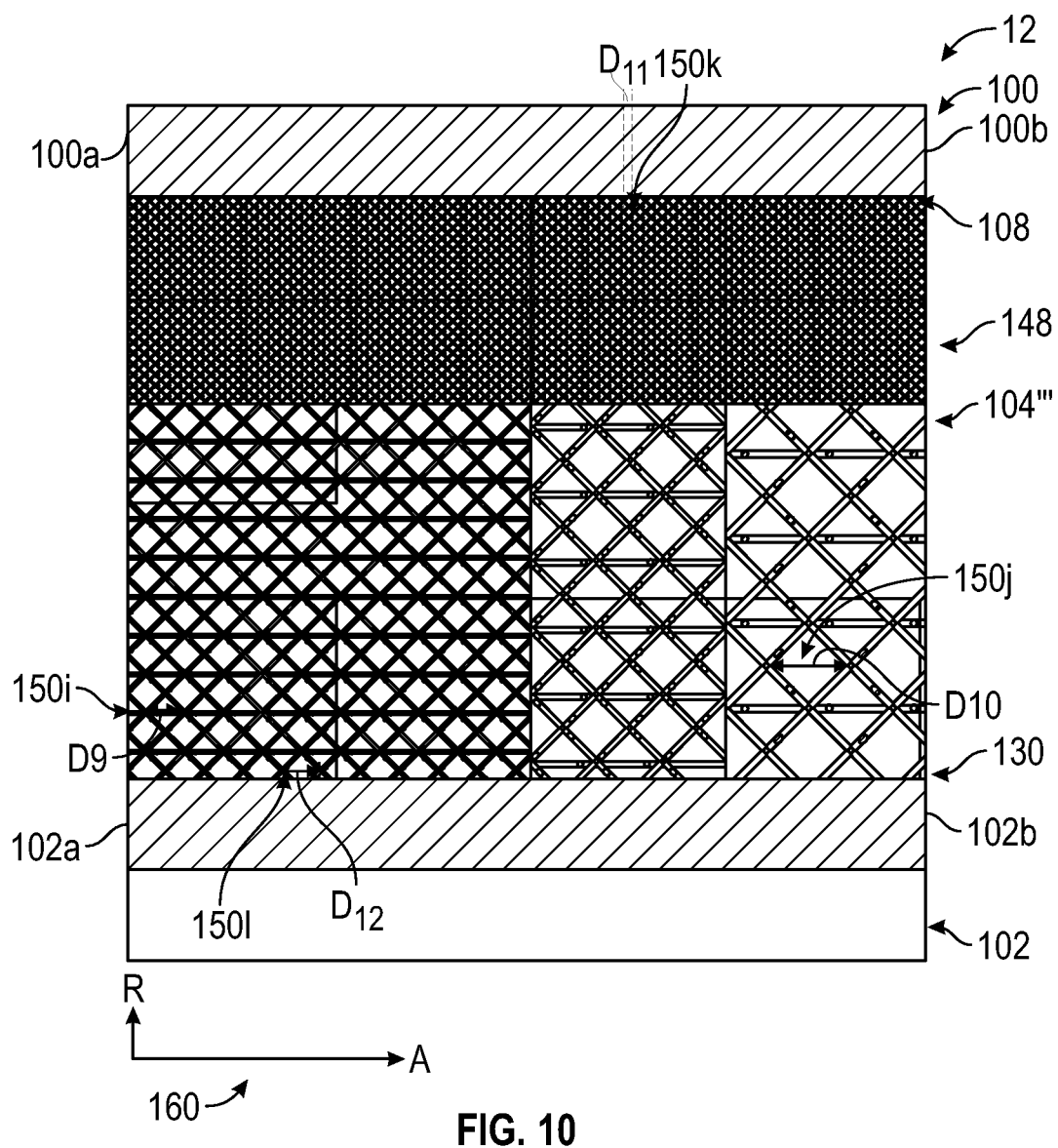
FIG. 10 is a schematic cross-sectional end view of another exemplary lattice for the containment system of FIG. 2, taken from the perspective of line 5-5 in FIG. 2, in which a density of a pattern of the lattice varies in a radial direction and an axial direction in accordance with various embodiments.

It should be noted that in still other embodiments, the lattice 104 may be configured differently. In one example, with reference to FIG. 10, the containment system 12 is shown with a lattice 104'''. The lattice 104' has a density of the pattern 148, which varies axially (in the axial direction A) and radially (in the radial direction R). In this example, the density of the pattern 148 is more compact or denser near or at the second surface 108 of the outer containment ring 100 and is less compact, less dense or coarse near or at the third surface 130 of the inner containment ring 102. The density of the pattern 148 is also more compact or denser near or at the first end 100a, 102a of the outer containment ring 100 and inner containment ring 102, respectively, and is less compact, less dense or coarse near or at the second end 100b, 102b of the outer containment ring 100 and inner containment ring 102, respectively. As shown, a rhombus 150i near or at the first end 100a, 102a has a distance D9; a rhombus 150j near the second end 100b, 102b has a distance D10; a rhombus 150k near or at the second surface 108 has a distance D11 and a rhombus 150l near the third surface 130 has a distance D12. In this example, the distance D10 is different than the distance D9, and the distance D9 is less than the distance D10. The distance D1l is different than the distance D12, and the distance D11 is less than the distance D12. Thus, in this example, the density of the pattern 148 decreases from the first end 100a, 102a to the second end 100b, 102b; and the density of the pattern 148 increases from the third surface 130 to the second surface 108. This change in density enables the containment system 12 to absorb a greater force near the first end 100a, 102a and in the radial direction R. Generally, the lattice 104''' is configured to withstand a pre-defined or pre-determined threshold force before fracturing or collapsing. Once an applied force exceeds the threshold force, the lattice 104''' collapses, which causes the inner containment ring 102 to move toward the outer containment ring 100. As is understood to one skilled in the art, the threshold force that the lattice 104''' may withstand is predetermined based on the material of the lattice 104", the structure of the lattice 104''', the density of the lattice 104''' and the thickness of the inner containment ring 102 and the outer containment ring 100 in relation to the lattice 104''', along with the design requirements for the containment system 12 for the particular configuration of the gas turbine engine 10. As will be discussed, the collapse of the lattice 104''' moves the containment system 12 from the first, expanded state to the second, interlocked state.

In order to form the containment system 12, in one example, with reference to FIG. 2, the containment system 12 is additively manufactured, via direct metal laser sintering (DMLS), laser powder bed fusion (L-PBF), electron powder bed fusion (E-PBF) or electron beam melting (EBM), such that the lattice 104, 104', 104", 104'''' is integrally formed with the outer containment ring 100 and the inner containment ring 102. After the containment system 12 is formed through additive manufacturing, the containment system 12 undergoes hot isostatic pressing (HIP) to reduce internal voids and improve porosity. It should be noted that although the lattice 104, 104', 104", 104''' are described and illustrated herein as being substantially uniform about a perimeter or circumference of the inner containment ring 102, the lattice 104, 104', 104", 104''' may be non-uniformly defined about the perimeter, if desired.

With the containment system 12 formed, the containment system 12 may be coupled to the gas turbine engine 10 so as to be positioned about one or more of the turbine disks 38 (FIG. 1A). During an event requiring containment of the turbine blades 40 and turbine disks 38, with reference to FIGS. 11A and 11B, the inner containment ring 102 absorbs energy to contain the turbine blades 40 and/or turbine disks 38. Once the respective pre-defined threshold force is exceeded, the lattice 104, 104', 104", 104''' collapses or fractures in the area of the applied force, which causes the inner containment ring 102 to interlock with the outer containment ring 100 such that the plurality of first projections 110 interlock with the plurality of second projections 118. An event requiring containment generally results in a local applied force F1 to the inner containment ring 102, which results in the lattice 104, 104', 104", 104" collapsing or fracturing locally or in a particular area of the containment system 12 such that in one example, an entirety of the lattice 104, 104', 104", 104" of the containment system 12 may not be collapsed during an event requirement containment.

Figure 11A:
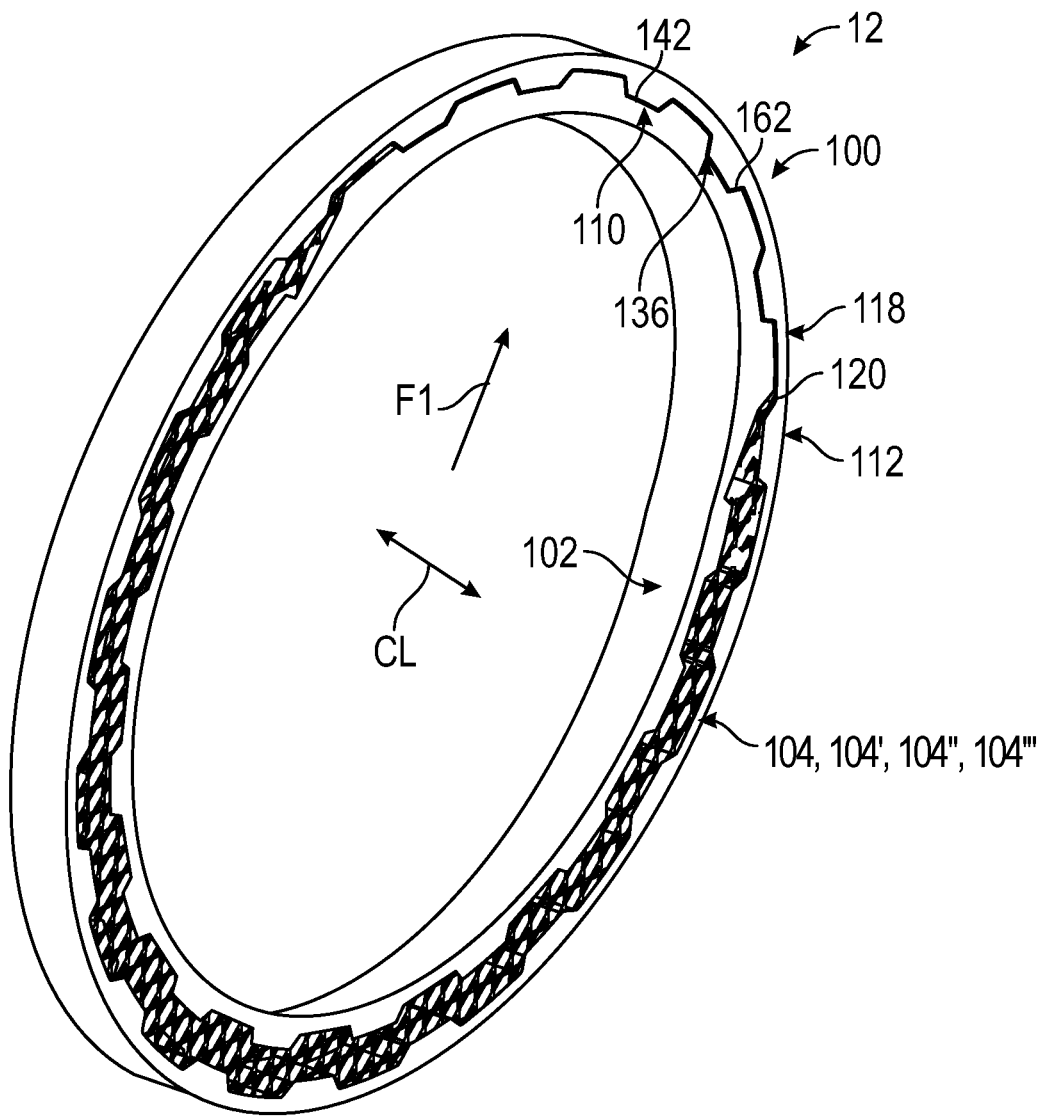
FIG. 11A is a front view of the containment system of FIG. 2, in which a portion of the containment system is in a second, interlocked state.

In this example, with reference to FIG. 11A, in the local area of the containment event, each of the first projections 110 is received within a respective one of the second reliefs 136 and is proximate to or substantially contacts a respective one of the second relief surfaces 142. Also in the area of the event, each of the second projections 118 is received within a respective one of the first reliefs 112 and is proximate to or substantially contacts a respective one of the relief surfaces 120. With reference to FIG. 11B, portions of the lattice 104, 104', 104", 104''' may be contained in a gap 162 defined between the adjacent ones of the first projections 110 and the second projections 118. In one example, each of the first projections 110 and the second projections 118 has an arc length L1, and the arc length L1 is less than an arc length L2 of each of the first reliefs 112 and the second reliefs 136 to define a plurality of respective gaps 162 about the circumference of the containment system 12. Each of the gaps 162 has an arc length L3, which is less than the arc length L1 and the arc length L2. Thus, the containment system 12 having the outer containment ring 100 interconnected to and integrally formed with the inner containment ring 102 by the lattice 104, 104', 104", 104''' meets the requirements for containment, while providing a reduced mass of the containment system 12 due to the porosity of the lattice 104, 104', 104", 104". The reduced mass can provide weight savings for the gas turbine engine 10 and a vehicle employing the gas turbine engine 10 (FIG. 1). Moreover, the reduced mass reduces operating costs associated with the gas turbine engine 10 (FIG. 1).

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A containment system for a gas turbine engine, comprising:
    an outer containment ring having at least a first projection that extends radially inward;
    an inner containment ring having a plurality of second projections that each extend radially outward toward the outer containment ring, the plurality of second projections including a first sub-ring of the plurality of second projections and at least a second sub-ring of the plurality of second projections, at least one second projection of the first sub-ring is misaligned with at least one second projection of the second sub-ring about a circumference of the inner containment ring, and a chamber is defined between the outer containment ring and the inner containment ring in a first state; and
    a lattice defined within the chamber that spans the chamber, the lattice integrally formed with each of the outer containment ring and the inner containment ring,
    wherein at least one of the plurality of second projections is configured to interlock with the at least first projection in a second state.

2. The containment system of claim 1, wherein the lattice is formed of a repeating pattern of a polygonal shape and is porous.

3. The containment system of claim 1, wherein a density of the lattice in the chamber varies in an axial direction from a first side of the inner containment ring to a second, opposite side of the inner containment ring.

4. The containment system of claim 1, wherein a density of the lattice in the chamber varies in a radial direction from the inner containment ring to the outer containment ring.

5. The containment system of claim 1, wherein a density of the lattice in the chamber varies in both an axial direction and a radial direction between the inner containment ring and the outer containment ring.

6. The containment system of claim 1, wherein the at least first projection includes a plurality of first projections, the plurality of first projections include at least a first sub-ring of the plurality of first projections spaced apart axially along a circumference of the outer containment ring from a second sub-ring of the plurality of first projections, the second sub-ring offset from the first sub-ring about the circumference of the outer containment ring such that each projection of the plurality of first projections of the first sub-ring is misaligned with each projection of the plurality of first projections of the second sub-ring.

7. A containment system for a gas turbine engine, comprising:
    an outer containment ring having a plurality of first projections spaced apart about a perimeter of the outer containment ring to define a plurality of first reliefs, and each of the plurality of first projections extend radially inward;
    an inner containment ring having a plurality of second projections spaced apart about a perimeter of the inner containment ring, the plurality of second projections including a first sub-ring of the plurality of second projections and at least a second sub-ring of the plurality of second projections, at least one second projection of the first sub-ring is misaligned with at least one second projection of the at least second sub-ring about a circumference of the inner containment ring, each of the plurality of second projections extend radially outward toward the outer containment ring, and a chamber is defined between the outer containment ring and the inner containment ring in a first state; and
    a porous lattice defined within the chamber that spans the chamber, the lattice integrally formed with each of the outer containment ring and the inner containment ring to extend about the perimeter of the inner containment ring and a density of the lattice varies in at least one of an axial direction and a radial direction,
    wherein at least one of the plurality of second projections is configured to interlock with at least one of the plurality of first projections in a second state.

8. The containment system of claim 7, wherein the plurality of first projections include at least a first sub-ring of the plurality of first projections spaced apart axially along a circumference of the outer containment ring from a second sub-ring of the plurality of first projections, the second sub-ring offset from the first sub-ring about the circumference of the outer containment ring such that each projection of the plurality of first projections of the first sub-ring is misaligned with each projection of the plurality of first projections of the second sub-ring.

9. The containment system of claim 7, wherein the density of the lattice in the chamber varies in the axial direction from a first side of the inner containment ring to a second, opposite side of the inner containment ring.

10. The containment system of claim 7, wherein the density of the lattice in the chamber varies in the radial direction from the inner containment ring to the outer containment ring.

11. The containment system of claim 7, wherein the density of the lattice in the chamber varies in both the axial direction and the radial direction between the inner containment ring and the outer containment ring.

12. A gas turbine engine, comprising:
    a rotating component;
    a containment system positioned about the rotating component, the containment system including:
        an outer containment ring having a first surface opposite a second surface, a first end opposite a second end, and at least a first projection that extends radially inward from the second surface;
        an inner containment ring having a third surface opposite a fourth surface, a third end opposite a fourth end, and a plurality of second projections that each extend radially outward from the third surface toward the second surface of the outer containment ring, the plurality of second projections including a first sub-ring of the plurality of second projections and at least a second sub-ring of the plurality of second projections, at least one second projection of the first sub-ring is misaligned with at least one second projection of the second sub-ring about a circumference of the inner containment ring, and a chamber is defined between the second surface and the third surface that extends from the first end and the third end to the second end and the fourth end, respectively, in a first state; and a porous lattice defined within the chamber that spans the chamber, the lattice integrally formed with each of the outer containment ring and the inner containment ring to extend between the second surface and the third surface, and from the first end and the third end to the second end and the fourth end, the lattice surrounds the at least first projection and the plurality of second projections within the chamber, wherein at least one of the plurality of second projections is configured to interlock with the at least first projection in a second state.

13. The gas turbine engine of claim 12, wherein the at least first projection includes a plurality of first projections, the plurality of first projections include at least a first sub-ring of the plurality of first projections spaced apart axially along a circumference of the outer containment ring from a second sub-ring of the plurality of first projections, the second sub-ring offset from the first sub-ring about the circumference of the outer containment ring such that each projection of the plurality of first projections of the first sub-ring is misaligned with each projection of the plurality of first projections of the second sub-ring.

* * * * *